US012756729B2

(12) United States Patent
Johnson

(10) Patent No.: US 12,756,729 B2
(45) Date of Patent: Oct. 6, 2026

(54) APPLYING NATURAL LANGUAGE PROCESSING ANOMALY MEASURES AS FEATURES FOR DNS TUNNELING DETECTION

(71) Applicant: Infoblox Inc., Santa Clara, CA (US)

(72) Inventor: Darin Johnson, Laurel, MD (US)

(73) Assignee: Infoblox Inc., Santa Clara, CA (US)

( * ) Notice: Subject to any disclaimer, the term of this patent is extended or adjusted under 35 U.S.C. 154(b) by 120 days.

(21) Appl. No.: 18/753,950

(22) Filed: Jun. 25, 2024

(65) Prior Publication Data

US 2025/0097245 A1 Mar. 20, 2025

Related U.S. Application Data

(60) Provisional application No. 63/538,591, filed on Sep. 15, 2023.

(51) Int. Cl.
*H04L 9/40* (2022.01)
*H04L 61/4511* (2022.01)

(52) U.S. Cl.
CPC ...... *H04L 63/1425* (2013.01); *H04L 61/4511* (2022.05); *H04L 63/20* (2013.01)

(58) Field of Classification Search
CPC ... H04L 63/1425; H04L 63/20; H04L 61/4511
See application file for complete search history.

(56) References Cited

U.S. PATENT DOCUMENTS 12,495,050 B2 * 12/2025 Szurdi .................... H04L 63/20
2012/0042381 A1 2/2012 Antonakakis
2016/0294773 A1 * 10/2016 Yu ...................... H04L 63/1425
2019/0058718 A1 * 2/2019 Pangeni .............. H04L 63/1425
2020/0014714 A1 * 1/2020 Mortensen .......... H04L 63/1483
2020/0112574 A1 4/2020 Koral
2021/0126901 A1 4/2021 Rodriguez
2021/0168160 A1 6/2021 Wang
2021/0266293 A1 8/2021 Liu
2024/0220613 A1 * 7/2024 Israel .................... G06F 21/554

OTHER PUBLICATIONS

Cruciani et al., Semi-supervised detection of Algorithmically Generated Domains using Neural Network-based Autoencoders, AI-Cybersec 2021: Artificial Intelligence and Cyber Security (AI-CyberSec) workshop, published Nov. 25, 2021.
Farnham et al., Detecting DNS Tunneling, SANS Institute InfoSec Reading Room, accepted on Feb. 25, 2013.
Github, iagox86/dnscat2, Jan. 3, 2022, pp. 1-15.
Github, yarrick/iodine: Official git repo for iodine dns tunnel, downloaded Sep. 8, 2023, pp. 1-11.
Yu et al., Behavior Analysis Based DNS Tunneling Detection and Classification with Big Data Technologies, Proceedings of the International Conference on Internet of Things and Big Data, 2016, pp. 284-290.

* cited by examiner

*Primary Examiner* — Viet D Vu
(74) *Attorney, Agent, or Firm* — Van Pelt, Yi & James LLP

(57) ABSTRACT

Various techniques for applying natural language processing (NLP) as features for DNS tunneling detection are disclosed. In some embodiments, a system/process/computer program product for applying natural language processing as features for DNS tunneling detection includes aggregating DNS traffic from one or more networks; automatically classifying the aggregated DNS traffic to detect DNS tunneling activity; and performing an action based on the detected DNS tunneling activity based on a policy.

15 Claims, 6 Drawing Sheets

APPLYING NATURAL LANGUAGE PROCESSING ANOMALY MEASURES AS FEATURES FOR DNS TUNNELING DETECTION

CROSS REFERENCE TO OTHER APPLICATIONS

This application claims priority to U.S. Provisional Patent Application No. 63/538,591 entitled APPLYING NATURAL LANGUAGE PROCESSING ANOMALY MEASURES AS FEATURES FOR DNS TUNNELING DETECTION filed Sep. 15, 2023, which is incorporated herein by reference for all purposes.

BACKGROUND OF THE INVENTION

Domain Name System network services are generally ubiquitous in IP-based networks. Generally, a client (e.g., a computing device) attempts to connect to a server(s) over the Internet by using web addresses (e.g., Uniform Resource Locators (URLs) including domain names or fully qualified domain names). Web addresses are translated into IP addresses. The Domain Name System (DNS) is responsible for performing this translation from web addresses into IP addresses. Specifically, requests including web addresses are sent to DNS servers that generally reply with corresponding IP addresses or with an error message in case the domain has not been registered, a non-existent domain.

BRIEF DESCRIPTION OF THE DRAWINGS

Various embodiments of the invention are disclosed in the following detailed description and the accompanying drawings.

DETAILED DESCRIPTION

Figure 1:
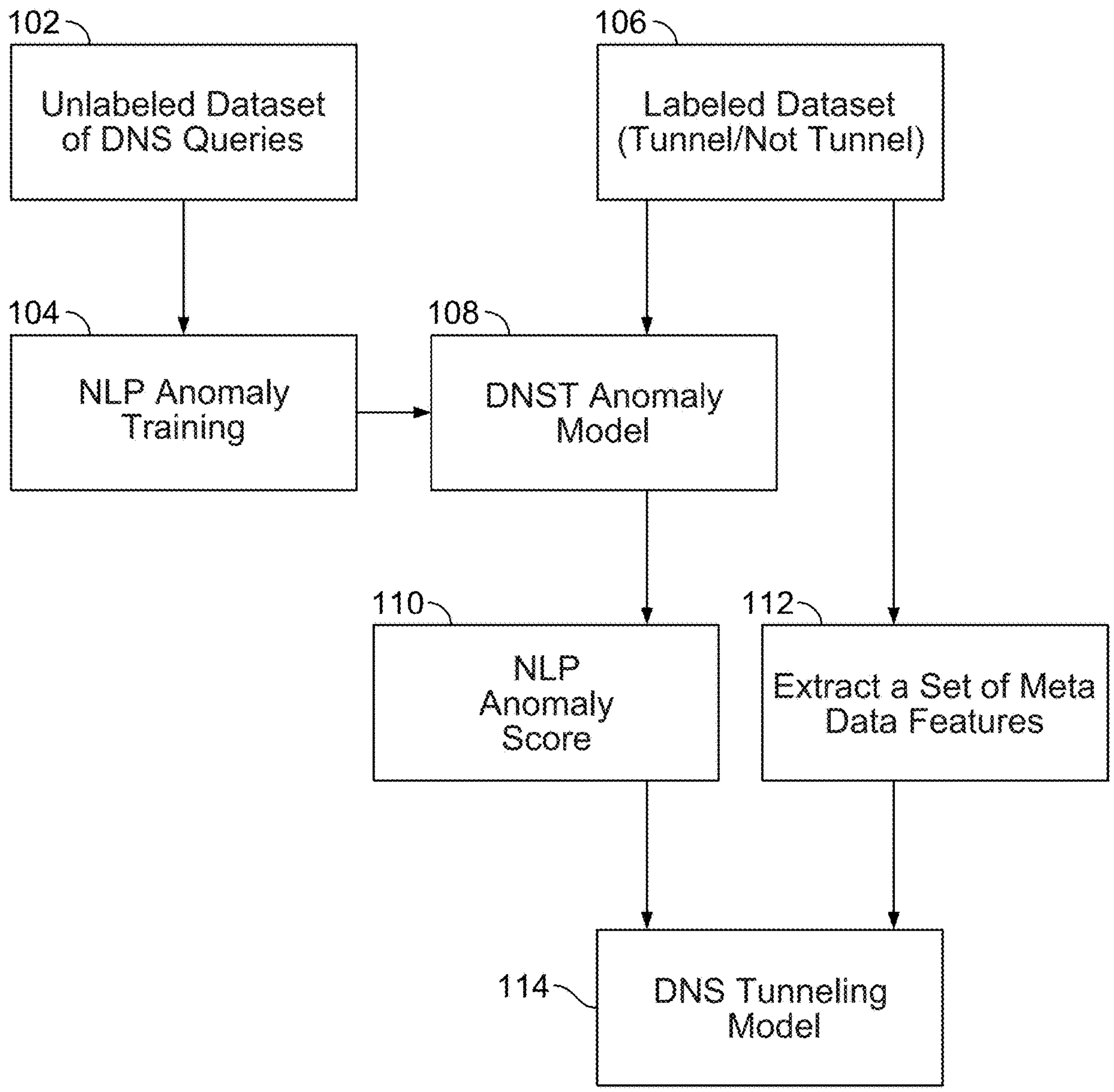
FIG. 1 illustrates a DNS tunneling training pipeline with natural language processing (NLP) anomaly scoring in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Technical Challenges for DNS Security

The Domain Name System (DNS) is a globally distributed database that provides core functionality for the operation of the Internet and local intranets. In particular, DNS provides the ability to locate Internet resource information, for example, IP addresses for domain names. The distributed nature of the DNS allows this resource information to be updated dynamically and controlled by the resource holders. To locate the current information, a client device, for example, a laptop, queries the DNS via a standard protocol. In practice, client devices do not perform the database lookup, referred to as resolution, themselves, but depend on other specialized servers to act on their behalf. These servers are called DNS recursive resolvers (e.g., a DNS recursor), and they are able to expedite the resolution of DNS records for a large number of clients through caching and optimized software. Recursive resolvers can also enact policies, for example, to limit client access to the Internet or specific resources.

DNS Tunneling (DNST) generally refers to a method of sending data over the DNS protocol other than what it was originally designed for. For example, this can include spam and antimalware tools acting as a remote query service as well as malware, such as command and control (C2) and exfiltration services. Due to the potential for abuse (e.g., using DNST for cyber-attacks and/or other undesired activities), there exists a need to detect and mitigate such DNS Tunneling activities. Existing approaches for DNST detection have typically used signatures and/or machine learning (see, e.g., Yu et al. "Behavior Analysis based DNS Tunneling Detection and Classification with Big Data Technologies", publicly available at https://pdfs.semanticscholar.org/b7bc/7d2eb9c0f18b5e0e5da3cc6903acfe7c29fe.pdf; and Farnham, Gregory. "Detecting DNS Tunneling", publicly available at https://sansorg.egnyte.com/dl/r4ouqZy5dp).

DNS Tunneling encodes content data into the fully qualified domain name (FQDN) of the query to send data to the server and the server can send data via encoding information into the answers. The encoding can depend on the type of query, several reference systems are publicly available including (see, e.g., Ekman, Erik. "Iodine", publicly available at https://github.com/yarrick/iodine; and "DNSCAT2", publicly available at https://github.com/iagox86/dnscat2).

Thus, new and improved techniques for DNS security, and specifically, new and improved techniques for DNST detection, are needed.

Overview of Techniques for DNS Tunneling Detection by Applying Natural Language Processing Anomaly Features Various techniques for applying natural language processing as features for DNS tunneling detection are disclosed. In some embodiments, a system/process/computer program product for applying natural language processing as features for DNS tunneling detection includes aggregating DNS traffic from one or more networks; automatically classifying the aggregated DNS traffic to detect DNS tunneling activity; and performing an action based on the detected DNS tunneling activity based on a policy.

In an example implementation, we focus on using content features to improve DNS tunneling (DNST) detection via DNS query-response logs. Specifically, content features can be applied by having positive and negative labeled datasets and using machine learning (ML) classifiers to determine a separation/distance based on features in either data set. An example content feature is to use counts of n-grams observed in the DNS query. An n-gram in this context is an n-char sequence of letters or numbers within the string, for example, the 3-grams of the string “hello” include “hel”, “ell”, “llo”. The count of n-grams is the number of times any given n-gram is observed, and this number can be compared with expected values in other strings.

However, n-grams are not a particularly strong feature, as the content features in the new tunnels may not match the training data. Further, an actor (e.g., a nefarious actor) may attempt to add some common substrings to the content of their tunnel to confuse such a DNST detection algorithm (e.g., a well-known penetration testing (pen test) tool prepends strings such as “www,” “post,” and “api” to its encodings to try to evade such existing DNST detection techniques).

Thus, new and improved techniques for applying natural language processing as features for DNS tunneling detection are disclosed.

Example System Embodiments for DNS Tunneling Detection by Applying Natural Language Processing Anomaly Features Example system embodiments for applying natural language processing (NLP) as features for DNS tunneling detection are further described below.

Anomaly Score and Classification Training

To avoid the above-described problems with existing DNST detection approaches, the disclosed techniques for DNST detection apply a natural language anomaly score as a feature for classifiers implemented using machine learning algorithms as further described below. Unlike typical classification algorithms where we would have labeled sets of data, the disclosed techniques define boundaries to separate the data. Specifically, in the disclosed anomaly detection classifiers, we only train on data considered “normal” and then determine a boundary that makes data outside of it as an outlier or an anomaly to facilitate DNST detection. The disclosed anomaly detection algorithms can use scores normalized between 0 and 1 to rank a datum as more normal (e.g., closer to 0) or anomalous (e.g., closer to 1).

String anomaly scores have been used in DNS systems previously, for instance, to detect Domain Generation Algorithms (DGA) (see, e.g., Cruciani et al. “Semi-supervised detection of Algorithmically Generated Domains using Neural Network-based Autoencoders”, https://pure.ulster.ac.uk/ws/portalfiles/portal/93270315/DGA_DetectionUsingAuto-Encoders_acc epted.pdf). However, in previous work, the focus has been to use the anomaly scores to create immediate alerts instead of combining them with other features as input to train a machine learning model.

More specifically, instead of using content features directly in our classifier/model implemented using a machine learning algorithm, such as n-grams of embeddings, we first train an anomaly detection algorithm on non-tunneled traffic (e.g., normal network traffic). Then, on our labeled datasets of tunnels and non-tunnels, we apply our anomaly detection scores to both the positive and negative labeled data as part of our feature engineering pipeline, which can be smoothed using an average, median, and/or standard deviation. These scores are combined with other common meta data features to create a feature vector used for training and evaluation of the classifier implemented using machine learning algorithms (e.g., using embeddings and distance vectors to implement an anomaly classifier, such as using an isolation forest, an auto encoder/Convolutional Neural Network (CNN) and loss function, and/or other ML techniques can similarly be implemented) for DNST detection that, for example, can be used in combination with one or more other classifiers to facilitate an effective and efficient DNST detection solution.

FIG. 1 illustrates a DNS tunneling training pipeline with natural language processing (NLP) anomaly scoring in accordance with some embodiments.

Based on our experiments, most DNS Tunneling (DNST) traffic appears different enough to facilitate an effective separation of the data. For example, two empirical trials that we performed used an isolation forest with n-grams (e.g., character 3-grams) and character-level convolutional neural network (CNN) autoencoder ML classifiers/models. Specifically, the disclosed stacked machine learning techniques for DNST detection are effectively classifying the DNS query traffic as normal or not normal (e.g., not normal being associated with likely DNST traffic activity based on the ML-based classification of extracted n-grams from the strings of the DNS query traffic, such as further described herein).

Referring to FIG. 1, at 102, an unlabeled dataset of DNS queries is provided as input for NLP anomaly training as shown at 104. For example, the NLP anomaly training can be implemented using an NLP anomaly training algorithm for DNST detection that effectively is learning to distinguish anomalous traffic activity based on learning normal and abnormal DNS queries. In our trials, we employed two NLP anomaly scoring techniques (NAST), The first example NAST was to vectorize the data using character n-grams and then training an isolation forest. The second example MLT was to use a 1-dimensional convolutional neural network (CNN) and use the output of the loss function (e.g., in our case, mean square error (MSE) or masked mean squared error (MMSE) as the anomaly score). Any similar NAST can similarly be applied as would now be apparent to one of ordinary skill in the art in view of the disclosed embodiments.

Also, a labeled dataset is provided as input as shown at 106. In this example implementation, the labeled dataset includes a dataset of DNS queries that is labeled as DNST or not DNST (e.g., based on prior analysis and/or DNS security expert manually labeling of the dataset of DNS queries).

The NLP anomaly training algorithm and the labeled dataset are then provided as input to the DNST anomaly model as shown at 108. In an example implementation, the DNST anomaly model (e.g., an ML-based classifier that performs NLP anomaly classification based on a score of the DNS query traffic between 0 (normal/not likely DNST traffic) and 1 (not normal/likely DNST traffic)) can be implemented using a CNN autoencoder with an MSE loss function, other anomaly detection algorithms can similarly be used for DNS anomaly scores long-term-short term memory (LSTM) autoencoders, sequence to sequence models, or one class support vector machines.

The DNST anomaly model processes the NLP anomaly training data to generate an NLP anomaly score as shown at 110.

Also, the labeled dataset (e.g., tunneled/not tunneled DNS queries) is used to extract a set of meta data features as shown at 112. Example metadata features include the number of unique queries in a given time period, the mean length of query names, the number or unique answers, and the DNS query time, The results of the NLP anomaly score (110) and the extracted set of meta data features (112) are provided as input into the DNS Tunneling (DNST) model that is generated at 114. In an example implementation, the DNST model can be implemented using a random forest, other models such as logistic regression, neural networks, or support vector machines can be employed as well.

As such, the disclosed techniques for providing a DNS tunneling training pipeline with NLP anomaly scoring can be implemented using stacked machine learning as described above with respect to FIG. 1. For example, the disclosed DNS tunneling detection techniques based on the above-described stacked machine learning using NLP of DNS queries can be more effective at detecting certain types of DNST activities that attempt to evade DNST detection using prior approaches for DNST detection, such as by DNST attackers inserting "WWW" into the DNS queries (e.g., prior approaches may classify such as legitimate domains due to the presence of "WWW" in the string in the DNS query thereby resulting in false negative (FN) results).

Figure 2:
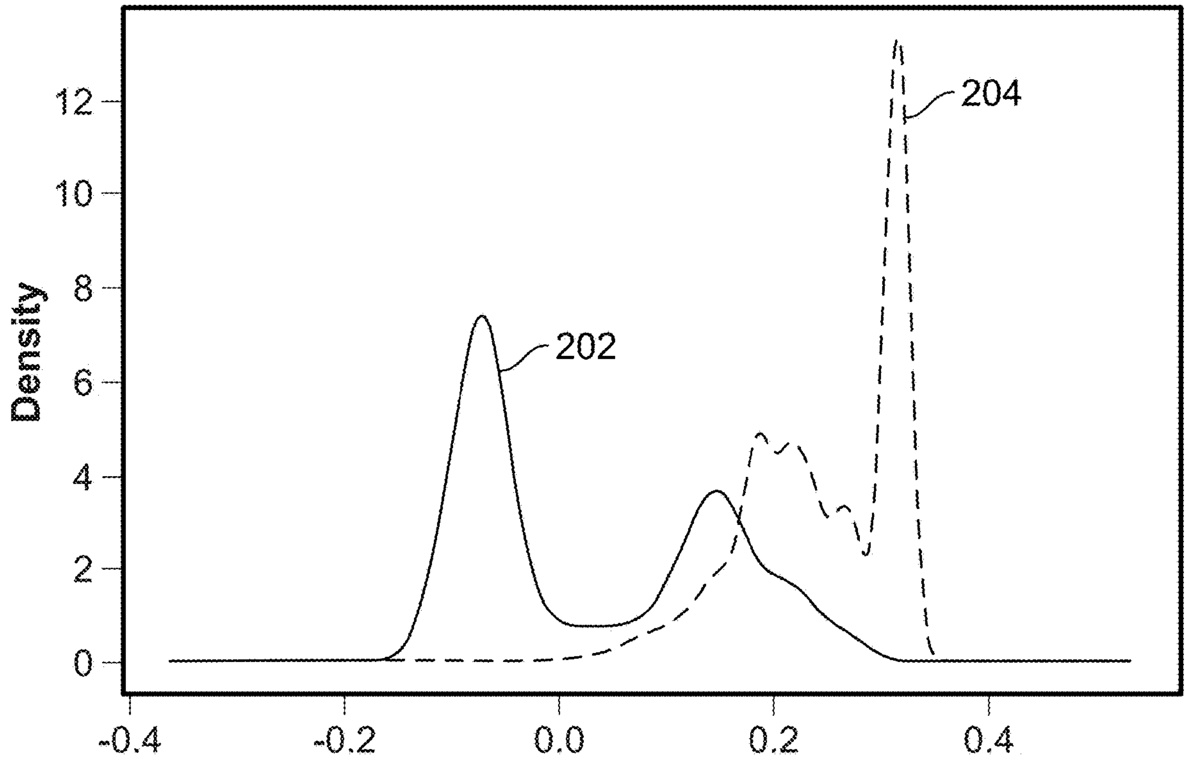
FIG. 2 illustrates n-gram anomaly detection using an isolation forest in accordance with some embodiments.

FIG. 2 illustrates n-gram anomaly detection using an isolation forest in accordance with some embodiments. Referring to FIG. 2, standard traffic is shown at 202, and tunneling traffic is shown at 204.

Figure 3:
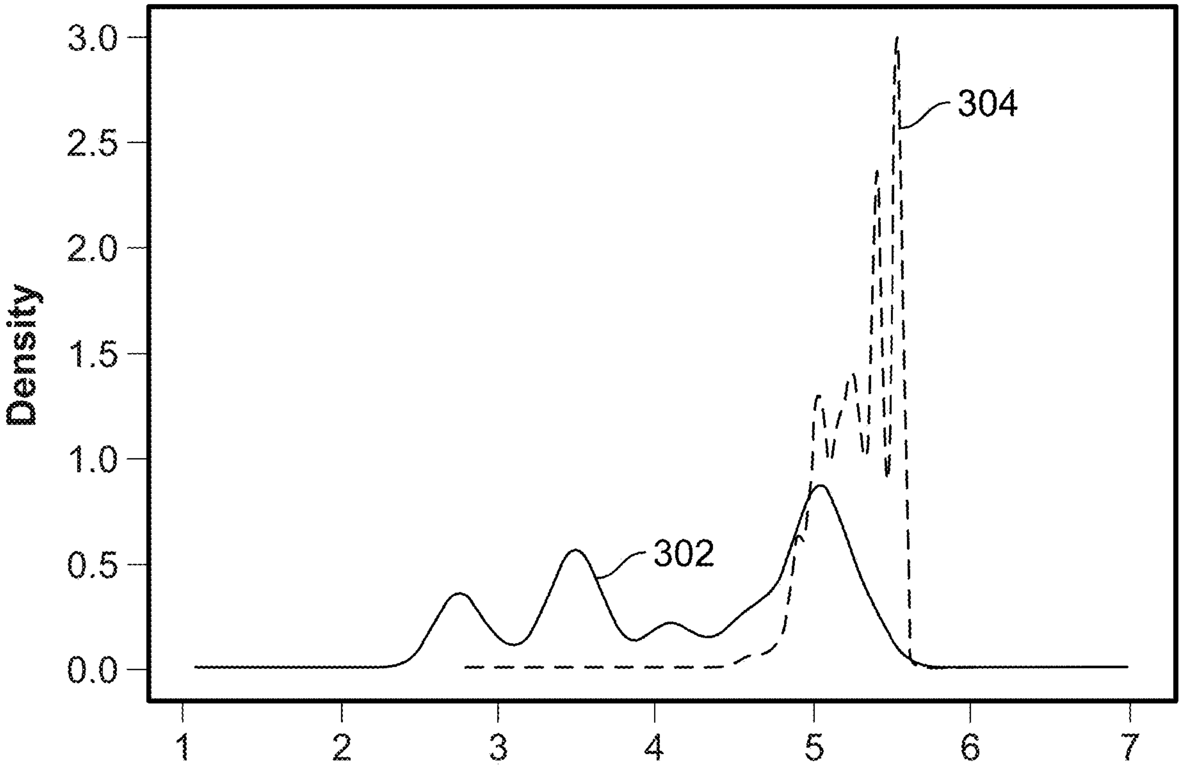
FIG. 3 illustrates neural network anomaly detection using an autoencoder in accordance with some embodiments.

FIG. 3 illustrates neural network anomaly detection using an autoencoder in accordance with some embodiments. Referring to FIG. 3, standard traffic is shown at 302, and tunneling traffic is shown at 304.

Specifically, FIGS. 2 and 3 show the kernel density estimates of tunneling and non-tunneling traffic. We were able to further demonstrate in empirical tests that using either of these anomaly scores increases the precision of a random forest classifier by 5.5% and the recall by 3.8%, and we were able to remove a significant number of other features (e.g., examples of features that we were able to remove include the following: n-gram tokens, the Gini index, classification error, and hand crafted lexical features).

Anomaly Score and Decision Inference

Figure 4:
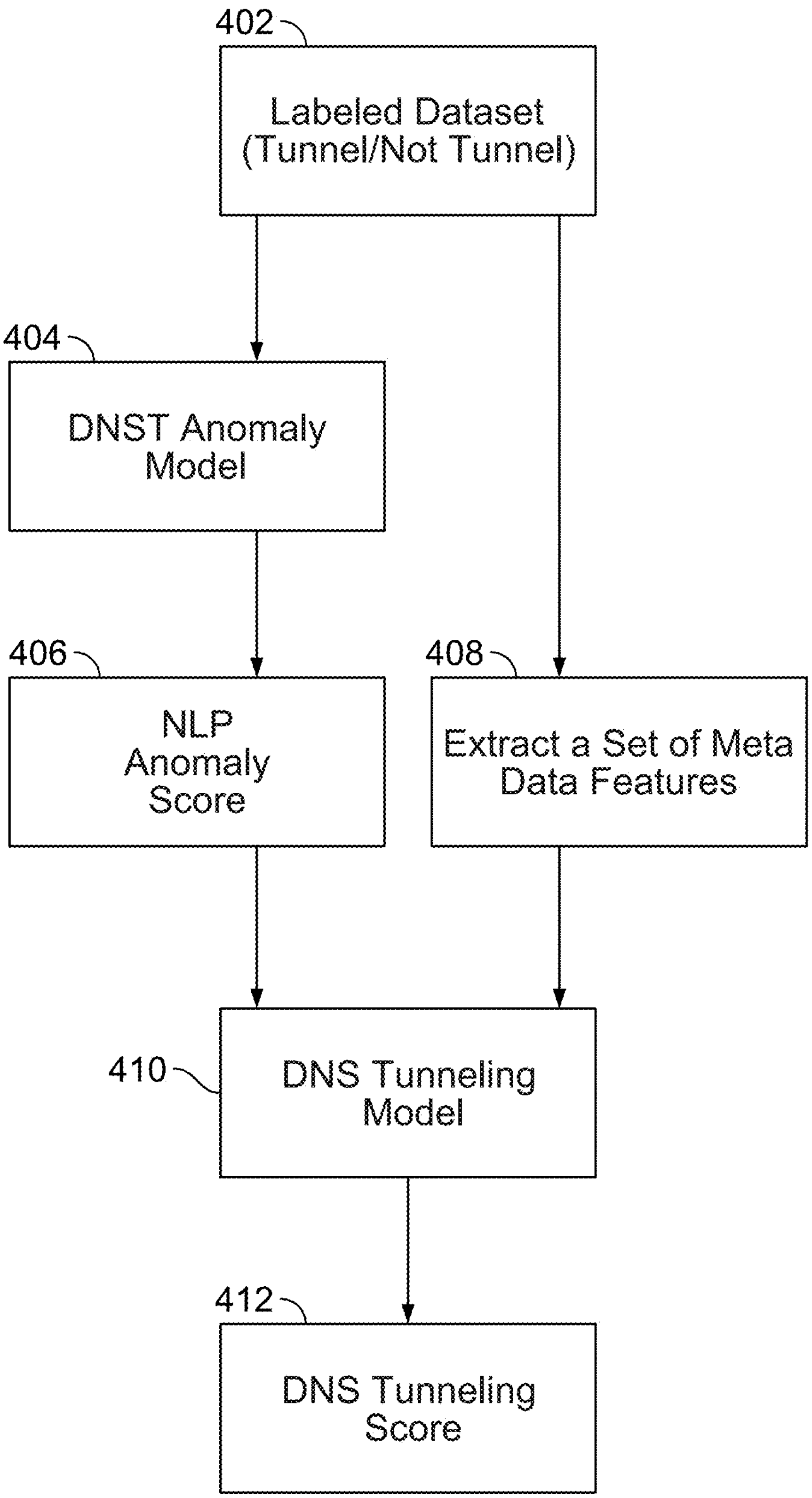
FIG. 4 illustrates a flow diagram for a DNS Tunneling Model Evaluation Pipeline with NLP anomaly scoring in accordance with some embodiments.

FIG. 4 illustrates a flow diagram for a DNS Tunneling Model Evaluation Pipeline with NLP anomaly scoring in accordance with some embodiments. Once the DNST anomaly model is trained, new data (e.g., network data) can be effectively and efficiently evaluated in streaming and batch environments. Specifically, FIG. 4 shows the canonical pipeline.

Referring to FIG. 4, at 402, a labeled dataset of DNS queries is provided as input for the DNST anomaly model as shown at 404. In this example implementation, the labeled dataset includes a dataset of DNS queries that is labeled as DNST or not DNST (e.g., based on prior analysis and/or a DNS security expert manually labeling of the dataset of DNS queries).

At 404, the DNST anomaly model processes the NLP anomaly training data to generate an NLP anomaly score as shown at 406.

Also, the labeled dataset (e.g., tunneled/not tunneled DNS queries) is used to extract a set of meta data features as shown at 408. For example, a feature can be a score that is based on a count of how many times a given n-gram extracted from the labeled dataset of tunneled/not tunneled DNS queries is associated with tunneled DNS queries or not tunneled DNS queries.

The results of the NLP anomaly score (406) and the extracted set of meta data features (408) are provided as input into the DNS Tunneling (DNST) model as shown at 410. In an example implementation, the DNST model can be implemented using a random forest. Examples of such meta data features can include the number of unique queries in a given time period, the mean and standard deviation of the length of query names, the number or unique answers and the DNS query time.

The DNST model is used to generate a DNS Tunneling (DNST) Score 412 for a given DNS query input, which can be performed in a streaming and batch implementation, such as further described below.

Streaming and Batch Implementation

In an example implementation, this pipeline can be placed within, for example, a DNS Behavioral Observation Streaming System (DBOSS), which is a DNS security framework where one specifies the transforms used to create the features for making observations of particular DNS behaviors and an evaluation criteria. In this example implementation, the NLP anomaly score provides another transform, and the evaluation criteria if the DNS Tunneling (DNST) Score is above a predetermined threshold (e.g., a threshold value of 0.5 or another threshold value can similarly be used for the DNST score). If the decision criteria for a domain is met, then an action can be performed based on a policy (e.g., a DNS security policy). For example, the domain can be automatically blocked and logged as having potential DNS tunneling behavior and/or flagged for secondary checks (e.g., and/or other actions can be performed, such as adding the domain to a block list and/or a threat feed, reporting the domain, quarantining the domain, automatically generating a new DNS signature for a domain, wherein the domain is associated with the detected DNS tunneling activity, etc.).

Example process embodiments for applying natural language processing (NLP) as features for DNS tunneling detection will now be further described below.

Figure 5:
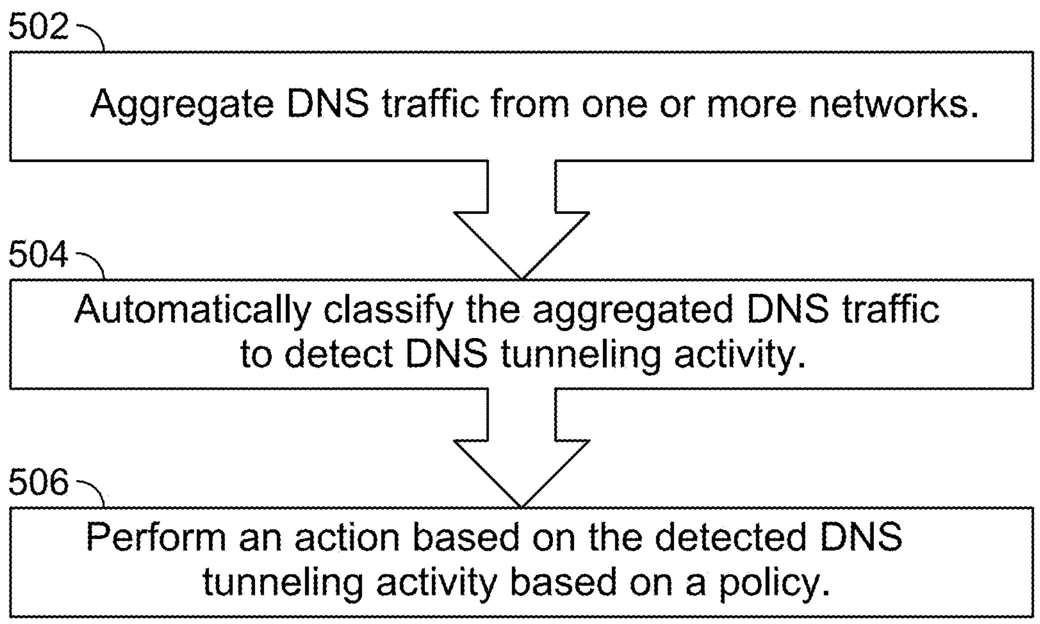
FIG. 5 illustrates a flow diagram for applying natural language processing anomaly measures as features for DNS tunneling detection in accordance with some embodiments.

Example Process Embodiments for DNS Tunneling Detection by Applying Natural Language Processing Anomaly Features FIG. 5 illustrates a flow diagram for applying natural language processing anomaly measures as features for DNS tunneling detection in accordance with some embodiments. In some embodiments, a process as shown in FIG. 5 is performed by a DNS Tunneling Model Evaluation Pipeline with NLP anomaly scoring and techniques as similarly described above including the embodiments described above with respect to FIGS. 1-4.

At 502, aggregating DNS traffic from one or more networks is performed, such as similarly described above with respect to FIGS. 1-4.

At 504, automatically classifying the aggregated DNS traffic to detect DNS tunneling activity is performed, such as similarly described above with respect to FIGS. 1-4.

At 506, performing an action based on the detected DNS tunneling activity based on a policy is performed, such as similarly described above with respect to FIGS. 1-4. For example, the domain can be automatically blocked and logged as having potential DNS tunneling behavior and/or flagged for secondary checks (e.g., and/or other actions can be performed, such as adding the domain to a block list and/or a threat feed, reporting the domain, quarantining the domain, automatically generating a new DNS signature for a domain, wherein the domain is associated with the detected DNS tunneling activity, etc.).

Figure 6:
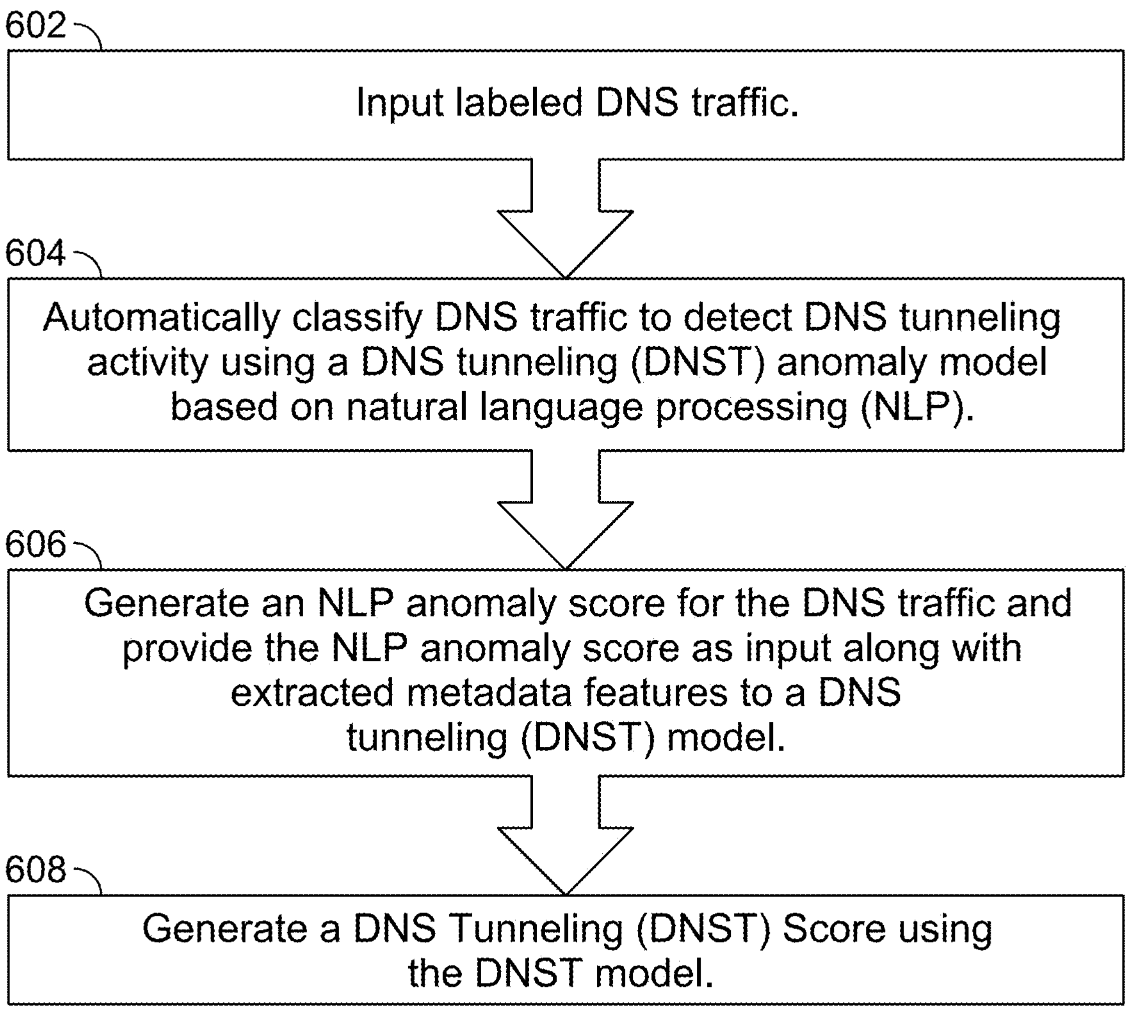
FIG. 6 illustrates another flow diagram for applying natural language processing anomaly measures as features for DNS tunneling detection in accordance with some embodiments.

FIG. 6 illustrates another flow diagram for applying natural language processing anomaly measures as features for DNS tunneling detection in accordance with some embodiments. In some embodiments, a process as shown in FIG. 6 is performed by a DNS Tunneling Model Evaluation Pipeline with NLP anomaly scoring and techniques as similarly described above including the embodiments described above with respect to FIGS. 1-4.

At 602, labeled DNS traffic is input, such as similarly described above with respect to FIG. 4. For example the labeled DNS traffic (e.g., including DNS queries) can be labeled as DNS tunneling traffic related or not DNS tunneling traffic related.

At 604, DNS traffic to detect DNS tunneling activity using a DNS tunneling (DNST) anomaly model based on natural language processing (NLP) is automatically classified, such as similarly described above with respect to FIG. 4.

At 606, an NLP anomaly score for the DNS traffic is generated and provided as input along with extracted metadata features to a DNS tunneling (DNST) model, such as similarly described above with respect to FIG. 4.

At 608, the DNST model generates a DNS Tunneling (DNST) Score, such as similarly described above with respect to FIG. 4. In an example implementation, the DNST model determines that a given DNS traffic input is associated with DNS traffic if the DNST score is above a predetermined threshold (e.g., a threshold value of 0.5 or another threshold value can similarly be used for the DNST score). Specifically, if the decision criteria for a domain is met, then an action can be performed based on a policy (e.g., a DNS security policy). For example, the domain can be automatically blocked and logged as having potential DNS tunneling behavior and/or flagged for secondary checks (e.g., and/or other actions can be performed, such as adding the domain to a block list and/or a threat feed, reporting the domain, quarantining the domain, automatically generating a new DNS signature for a domain, wherein the domain is associated with the detected DNS tunneling activity, etc.).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
aggregate DNS traffic from one or more networks;
automatically classify the aggregated DNS traffic to detect DNS tunneling activity, comprising to:
determine a count of a number of times a given n-gram is extracted from the aggregated DNS traffic;
determine an anomaly score based on the count;
input the anomaly score into a tunneling model to generate a DNS tunneling score, wherein the tunneling model implements a random forest technique;
determine that the DNS tunneling score is equal to or greater than a predetermined threshold; and
in response to a determination that the DNS tunneling score is equal to or greater than the predetermined threshold, add a domain associated with the aggregated DNS traffic to a block list; and
perform an action based on the detected DNS tunneling activity based on a policy, comprising to:
block the domain in near real-time at a DNS security platform; and
a memory coupled to the processor and configured to provide the processor with instructions.

2. The system recited in claim 1, wherein automatically classifying the aggregated DNS traffic to detect the DNS tunneling activity is performed using a classifier.

3. The system recited in claim 1, wherein automatically classifying the aggregated DNS traffic to detect the DNS tunneling activity is performed using a classifier that is trained for neural network anomaly detection using an autoencoder.

4. The system recited in claim 1, wherein the aggregated DNS traffic is collected from a plurality of monitored enterprise, university, and/or government networks.

5. The system recited in claim 1, wherein a domain is identified as associated with the detected DNS tunneling activity, and wherein an action is performed based on the policy.

6. The system recited in claim 1, wherein the processor is further configured to:
identify the domain as associated with the detected DNS tunneling activity.

7. The system recited in claim 1,
wherein the domain is blocked at least for a predetermined period of time.

8. The system recited in claim 1, wherein the processor is further configured to:
report the domain.

9. The system recited in claim 1, wherein the processor is further configured to:
quarantine the domain, wherein the domain is associated with the detected DNS tunneling activity.

10. The system recited in claim 1, wherein the processor is further configured to:
automatically generate a new DNS signature for the domain, wherein the domain is associated with the detected DNS tunneling activity.

11. A method, comprising:
aggregating DNS traffic from one or more networks;
automatically classifying the aggregated DNS traffic to detect DNS tunneling activity, comprising:
determining a count of a number of times a given n-gram is extracted from the aggregated DNS traffic;
determining an anomaly score based on the count;
inputting the anomaly score into a tunneling model to generate a DNS tunneling score, wherein the tunneling model implements a random forest technique;
determining that the DNS tunneling score is equal to or greater than a predetermined threshold; and in response to a determination that the DNS tunneling score is equal to or greater than the predetermined threshold, adding a domain associated with the aggregated DNS traffic to a block list; and performing an action based on the detected DNS tunneling activity based on a policy, comprising:

blocking the domain in near real-time at a DNS security platform.

12. The method of claim 11, wherein automatically classifying the aggregated DNS traffic to detect the DNS tunneling activity is performed using a classifier.

13. The method of claim 11, wherein automatically classifying the aggregated DNS traffic to detect the DNS tunneling activity is performed using a classifier that is trained for neural network anomaly detection using an autoencoder.

14. The method of claim 11, wherein the aggregated DNS traffic is collected from a plurality of monitored enterprise, university, and/or government networks.

15. A computer program product embodied in a non-transitory computer readable medium and comprising computer instructions for:

aggregating DNS traffic from one or more networks;

automatically classifying the aggregated DNS traffic to detect DNS tunneling activity, comprising:

determining a count of a number of times a given n-gram is extracted from the aggregated DNS traffic;

determining an anomaly score based on the count;

inputting the anomaly score into a tunneling model to generate a DNS tunneling score, wherein the tunneling model implements a random forest technique;

determining that the DNS tunneling score is equal to or greater than a predetermined threshold; and in response to a determination that the DNS tunneling score is equal to or greater than the predetermined threshold, adding a domain associated with the aggregated DNS traffic to a block list; and performing an action based on the detected DNS tunneling activity based on a policy, comprising:

blocking the domain in near real-time at a DNS security platform.

* * * * *